United States Patent
Quinn et al.

(10) Patent No.: US 12,215,675 B2
(45) Date of Patent: Feb. 4, 2025

(54) SELF-CLAMPING CABLE GUARD FOR CLAMPING POWER CABLES OF A POWER CABLE BUNDLE OF A CABLE SUPPORT ARRANGEMENT IN A WIND TURBINE, CABLE SUPPORT ARRANGEMENT AND WIND TURBINE

(71) Applicant: Siemens Gamesa Renewable Energy A/S, Brande (DK)

(72) Inventors: Thomas F. Quinn, Oviedo, FL (US); Nicholas VanDam, Sanford, FL (US)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 173 days.

(21) Appl. No.: 17/796,697

(22) PCT Filed: Feb. 5, 2021

(86) PCT No.: PCT/EP2021/052753
§ 371 (c)(1),
(2) Date: Aug. 1, 2022

(87) PCT Pub. No.: WO2021/160527
PCT Pub. Date: Aug. 19, 2021

(65) Prior Publication Data
US 2023/0340946 A1    Oct. 26, 2023

(30) Foreign Application Priority Data
Feb. 13, 2020    (EP) .................................. 20157253

(51) Int. Cl.
*F03D 80/80* (2016.01)
*F16L 3/223* (2006.01)

(52) U.S. Cl.
CPC .............. *F03D 80/85* (2016.05); *F16L 3/223* (2013.01)

(58) Field of Classification Search
CPC .................................. F03D 80/85; F16L 3/223
See application file for complete search history.

(56) References Cited

U.S. PATENT DOCUMENTS 3,092,360 A * 6/1963 Cook ........................ F16L 5/00
174/153 G
8,866,330 B2 * 10/2014 Domesle ................ F03D 13/20
290/55

(Continued)

FOREIGN PATENT DOCUMENTS

| CN | 102165660 A | 8/2011 |
| CN | 104718678 A | 6/2015 |

(Continued)

OTHER PUBLICATIONS

PCT International Search Report and Written Opinion of International Searching Authority mailed Jun. 1, 2021 corresponding to PCT International Application No. PCT/EP2021/052753 filed Feb. 5, 2021.

*Primary Examiner* — Anita M King
(74) *Attorney, Agent, or Firm* — Schmeiser, Olsent & Watts LLP (57) ABSTRACT

A self-clamping cable guard for clamping power cables of a power cable bundle of a cable support arrangement in a wind turbine, whereby the self-clamping cable guard includes three recesses arranged about a central longitudinal axis of the self-clamping cable guard for positively clamping a power cable of the power cable bundle inside of each of the three recesses, and whereby the self-clamping cable guard includes three wear protection plates arranged about the central longitudinal axis, whereby each of the three recesses includes an open side for insertion of a respective power cable of the power cable bundle therein, each of the open sides of one of the three recesses being respectively limited by two of the three wear protection plates to protect the (Continued)

power cables clamped inside the recesses from wear. A cable support arrangement for a wind turbine and a wind turbine is also provided.

11 Claims, 5 Drawing Sheets

(56) References Cited

U.S. PATENT DOCUMENTS

| | | | | |
|---|---|---|---|---|
| 9,512,824 | B2* | 12/2016 | Bräbander | H02G 3/32 |
| 9,551,326 | B2 | 1/2017 | Caspari et al. | |
| 9,556,974 | B2* | 1/2017 | Even | F03D 80/80 |
| 10,096,400 | B2* | 10/2018 | Ohkubo | H05K 9/0086 |
| 11,228,165 | B2* | 1/2022 | Guo | F16L 3/10 |
| 2010/0247326 | A1* | 9/2010 | Prebio | F03D 80/00 |
| | | | | 29/889 |
| 2011/0147543 | A1 | 6/2011 | Koga et al. | |
| 2013/0068496 | A1 | 3/2013 | Domesle et al. | |
| 2013/0187012 | A1 | 7/2013 | Blakeley et al. | |
| 2015/0222106 | A1 | 8/2015 | Caspari et al. | |
| 2015/0260166 | A1* | 9/2015 | Olesen | F03D 13/20 |
| | | | | 290/55 |
| 2022/0390042 | A1* | 12/2022 | Peterson | F16L 3/105 |

FOREIGN PATENT DOCUMENTS

| | | |
|---|---|---|
| CN | 104917116 A | 9/2015 |
| DE | 102008046658 A1 | 3/2010 |
| EP | 2918828 A1 | 9/2015 |
| WO | 2012013346 A1 | 2/2012 |

\* cited by examiner

SELF-CLAMPING CABLE GUARD FOR CLAMPING POWER CABLES OF A POWER CABLE BUNDLE OF A CABLE SUPPORT ARRANGEMENT IN A WIND TURBINE, CABLE SUPPORT ARRANGEMENT AND WIND TURBINE

CROSS-REFERENCE TO RELATED APPLICATIONS

This application claims priority to PCT Application No. PCT/EP2021/052753, having a filing date of Feb. 5, 2021, which claims priority to EP Application No. 20157253.4, having a filing date of Feb. 13, 2020, the entire contents both of which are hereby incorporated by reference.

FIELD OF TECHNOLOGY

The following is directed to a self-clamping cable guard for clamping power cables of a power cable bundle of a cable support arrangement in a wind turbine, cable support arrangement and a wind turbine.

BACKGROUND

The nacelle of a wind turbine is usually mounted to the tower by means of a yaw interface, so that the nacelle can be yawed. This allows the rotor blades of the wind turbine to be optimally positioned into the wind. Electricity produced by the generator of the wind turbine is transported from the generator's windings to a transmission cable arrangement in the tower of the wind turbine, and usually transported using multiple power-phase cable sets, depending on the power rating of the wind turbine. For example, power from a 4 MW generator can be transported over seven sets of three-phase cables, so that twenty-one power cables are required. The power cables extend from the generator into the tower and down through the tower to an overland or subsea power transmission line. The power cables themselves are heavy, and must be supported in the tower. Therefore, over most of the tower height, the cables are fixed by suitable holders in an essentially vertical stationary transmission cable arrangement.

However, an upper portion of the power cables—i.e. some length of a power cable arrangement between the generator and the stationary fixed transmission cable arrangement in the tower—must allow for a yaw motion of the nacelle. It is usual for a yaw drive to be able to turn the nacelle through two full revolutions in either direction. Therefore, this length of the power cable arrangement must be flexible enough to permit such a rotational motion of the nacelle. To this end, known cable arrangements in a flexible portion between the yaw drive level and the transmission cable arrangement—referred to as a "power cable twist arrangement" or "power cable loop"—try to hold the cables in such a way as to keep the individual cables apart, and to ensure that the rotational displacement of the nacelle is transferred evenly over the length of the flexible portion. For example, in the state of the art, the individual cables of the power cable twist arrangement are passed through holes in a number of cable guides. Several cable guides can be used and spaced at intervals. Such an arrangement ensures that the individual cables of the power cable twist arrangement are held at a distance apart over the length of the power cables in this flexible portion.

A problem associated with the known cable guide arrangements is that the overall power cable loop is very large and cumbersome. Usually, the power cable loop is assembled by arranging a suitable number of cable guides over a set of interface power cables that will connect the generator to the transmission cables secured to the tower wall. For example, eight cable guides, each with twelve through-openings, can be arranged at intervals over a set of twelve interface power cables. The position of a cable guide along the power cable loop is fixed by securing it to one or more of the power cables, for example using a cable tie. However, such ties should not be too tight, since some degree of freedom is needed to allow the power cables to twist relative to each other and relative to the cable guide during a yawing motion. As a result, a cable guide can slip downwards along the power cable loop, so that eventually the cable guides are no longer positioned at regular intervals and cannot fulfil their intended functions of keeping the power cables apart and distributing the yawing motion along the length of the power cable loop.

The length of the flexible portion or power cable loop can be about 10 to 12 m or more. Once the wind turbine tower has been erected, a crane is required to hoist the power cable loop into place. The crane must be able to lift to a height corresponding to the sum of the tower height and the power cable loop length. This requirement adds significantly to the overall costs of installing a wind turbine, particularly at difficult locations such as offshore wind parks.

An improved way of arranging power cables between the generator and the tower of the wind turbine dealing with the aforementioned problems is known from EP 2 918 828 A1. Therein, it is suggested that a cable support arrangement is realized to support a plurality of power cable bundles in an upper region of a wind turbine tower, which cable support arrangement comprises a plurality of cable bundle guides, wherein a cable bundle guide comprises a plurality of through-openings, wherein each through-opening is realized to encompass a power cable bundle comprising a plurality of power cables and an offset fixation means realized to maintain an offset distance between consecutive cable bundle guides.

However, a power cable is usually a thick copper cable encased in insulating sheath, and only has a limited degree of flexibility. When the wind turbine is operating at or near its rated power output, the power cables become hot. When the flexible portion twists to follow a yawing motion of the nacelle, a power cable can be pressed with some force against the edge of the cable guide hole through which it passes, so that the cable is stressed. A hot power cable can become bent or otherwise distorted as a result. For example, the insulation of the cable can wear, revealing the cable core (usually multiple strands of copper wire twisted into a cable). Repeated stress can result in damage to the core of the cable, for example the individual copper strands can fracture or break. Such damage can lead to a cable fire.

SUMMARY

Therefore, an aspect relates to avoid wear of the power cables inside the wind turbine at little cost.

According to a first aspect of embodiments of the invention, the aspect is solved by means of a self-clamping cable guard for clamping power cables of a power cable bundle of a cable support arrangement in a wind turbine, whereby the self-clamping cable guard comprises three recesses arranged about a central longitudinal axis of the self-clamping cable guard for positively clamping a power cable of the power cable bundle inside of each of the three recesses, and whereby the self-clamping cable guard comprises three wear protection plates arranged about the central longitudinal axis, whereby each of the three recesses comprises an open side for insertion of a respective power cable of the power cable bundle therein, each of the open sides of one of the three recesses being respectively limited by two of the three wear protection plates to protect the power cables clamped inside the recesses from wear.

The self-clamping cable guard clamps the power cables of a power cable bundle so that they are arranged in a pre-defined position with respect to each other and protects them from wear by means of the wear protection plates.

The cable guard being self-clamping means that there are no exterior clamping means for interlocking the power cables in the recesses of the self-clamping cable guard. Instead, the cable guard clamps the power cables by itself. This may be achieved by means of an elastic and/or flexible design of the self-clamping cable guard and/or by undersizing the recesses with respect to the power cables. Undersizing in particular means that the surface of the recesses are made slightly smaller than the cross section of the power cables such that the recesses are widened when the power cables are inserted therein. In a circular design of the recesses and circular power cables, the diameter of the recesses may be smaller than the diameter of the power cables to provide undersizing of the recesses with respect to the power cables. Thereby, a clamping force acts on the power cable when the power cable is inserted into the recess by virtue of the widened recess due to the inserted power cable and/or due to the elastic and/or flexible design of the self-clamping cable guard.

The self-clamping cable guard may be used for any cables, in particular power cables, of the wind turbine. However, the preferred application of the self-clamping cable guard is to clamp the power cables of a power cable bundle of the cable support arrangement in a wind turbine.

The self-clamping cable guard comprises three recesses. However, it is possible that the self-clamping cable guard comprises more than three recesses. But it is preferred, that the self-clamping cable guard comprises exactly three recesses. Thereby, in each of the recesses a power cable of a power cable bundle with three power cables may be clamped. Each of the three power cables may correspond to one phase for a three-phase generator of the wind turbine. The three recesses may be arranged in a triangular form.

The central longitudinal axis runs through a center point of the self-clamping cable guard and along its length.

The recesses may be round, in particular circular, inside of the self-clamping cable guard. The circular recesses may have a tube-like shape inside of the self-clamping cable guard and along its length. Thereby, round, in particular circular, power cables may be positively clamped inside of the circular recesses with ease.

The wear protection plates may be partially arranged around the recesses. Further, the wear protection plates must not be separate parts but merely provide plate-like protection of the power cables from wear. For this purpose, the wear protection plates may have a flat or substantially flat wear protection surface.

It is preferred, that the self-clamping cable guard is made from an elastic and/or flexible material such that the recesses may be elastically widened for receiving the power cables and elastically reset to clamp the power cables. A plastic, in particular a hardened plastic, may be used as a material or the self-clamping cable guard, for example.

It is further preferred, that the self-clamping cable guard comprises a center portion, whereby the center portion has a center point congruent with the central longitudinal axis and the center portion has the shape of a circular triangle with concave circular arc edges. Further, the recesses may have the concave circular arc edges of the circular triangle shape as edges thereof. In such a design, the recesses and thereby the power cables are clamped in close proximity to each other such that the size of the self-clamping cable guard can be kept conveniently small.

Therein, it is preferred, that the self-clamping cable guard comprises three outer portions extending outwards from the center portion, whereby each of the outer portions is attached to a vertex part of the circular triangle shape of the center portion. The vertex part must not have a vertex but is the part having the lowest thickness of the center portion or, in other words, is where the concave circular arc edges of its circular triangle shape run together. The clamping force for the power cables may then be applied by means of the outer portions and the concave circular arc edges of the circular triangle shape of the center portion. Thereby, a particular even spread of the clamping force on the power cables may be achieved.

Moreover, it is preferred, that each of the outer portions has the shape of a circular triangle with two concave circular arc edges and one straight edge, wherein the straight edge is a wear protection surface of the three wear protection plates. Here, the two concave circular arc edges of the circular triangle shape of the outer portions apply the clamping force together with the concave circular arc edges of the circular triangle shape of the center portion. Further, wear protection surfaces are provided as straight edges. Thereby, force applied onto the wear protection plates may provide further force intensifying the clamping and ensure safe clamping of the power cables inside of the self-clamping cable guard.

Also, it is preferred, that the wear protection plates are congruent with an imaginary triangle, the imaginary triangle having a center point congruent with the central longitudinal axis and circumscribing the self-clamping cable guard. Thereby, the wear protection plates are arranged in a triangle shape and able to protect the power cables from three sides from wear.

Moreover, it is preferred, that the self-clamping cable guard is monolithically designed. Thereby, the self-clamping cable guard may be made from one single piece and material. This enables particularly low-cost production of the self-clamping cable guard.

Further, it is preferred, that the self-clamping cable guard is injection molded. Thereby, the self-clamping cable guard is produced at particularly low costs. A long self-clamping cable guard can be produced and afterwards cut to self-clamping cable guards of a required length.

According to a second aspect of embodiments of the invention, the aspect is solved by means of a cable support arrangement for a wind turbine comprising multiple self-clamping cable guards according to the first aspect of embodiments of the invention, whereby the cable support arrangement comprises at least one cable bundle guide and multiple power cable bundles, each power cable bundle consisting of three power cables, and whereby each of the multiple self-clamping cable guards clamps in every one of its three recesses one of the three power cables of each of the multiple power cable bundles, and whereby each one of the multiple self-clamping cable guards with the power cables clamped inside thereof is arranged in one of multiple through-openings inside of the at least one cable bundle guide.

Thereby, the three power cables of each of the power cable bundle are protected from wear when moving inside the through-openings due to protection by means of the wear protection plates of the self-clamping cable guards clamping the three power cables.

Multiple cable bundle guides may be us used to hold the power cable bundles at a certain distance from each other. Adjacent pairs of cable bundle guides may be secured to each other by wires of essentially equal length or other means.

The shape of the multiple through-openings in the at least one cable bundle guide is based on a cross-sectional shape of the power cable bundle. The through-openings may be dimensioned to allow some clearance between their edges and the self-clamping cable guards or for form-fit of the self-clamping cable guards in the through-openings.

It is preferred, that the multiple through-openings inside of the at least one cable bundle guide have a triangular shape with straight edges and the wear protection plates of the self-clamping cable guards are arranged parallel to the straight edges of the triangular shape of the through-openings. Thereby, the straight edges of the triangular shape of the through openings are aligned with the wear protection plates such that the wear protection plates are evenly subjected to wear and the power cables cannot be subjected to wear at the open sides of the recesses of the self-clamping cable guard.

Moreover, it is preferred, that the at least one cable bundle guide comprises a tilting mechanism for tilting the cable bundle guide around a tilting axis perpendicular to the central longitudinal axis of the multiple self-clamping cable guards. This allows for further flexibility of the power cable bundle guide with respect to the movement of the power cable bundles and thus further reduces wear.

Also, it is preferred, that the cable bundle guide is a circular plate and the multiple through-openings are arranged about a center point of the circular flat plate. Thereby, a compact configuration of the cable bundle guide is achieved.

The cable support arrangement may be arranged to support the multiple power cable bundles in an upper region of a tower of a wind turbine. Further, the cable support arrangement may comprise an offset fixation means realized to maintain an offset distance between consecutive cable bundle guides. The offset fixation means ensures that the cable bundle guides remain at regular intervals, so that these always fulfil their intended functions of keeping the power cable bundles apart and distributing the yawing motion along the length of the power cable bundles. In the cable support arrangement, adjacent cable bundle guides may be connected by the offset fixation means, so that it is sufficient to secure the position of only one upper cable bundle guide at some point in order to fix the positions of the remaining cable bundle guides.

According to a third aspect of embodiments of the invention, the aspect is solved by means of a wind turbine comprising a nacelle mounted on top of a tower of the wind turbine, a generator arranged inside the nacelle for generating electricity and at least one self-clamping cable guard according to the first aspect of embodiments of the invention or a cable support arrangement according to the second aspect of embodiments of the invention.

In the wind turbine, a plurality of power cable bundles may extend from the generator to a stationary transmission cable arrangement in an upper region of the tower. The wind turbine may further be arranged to allow a yaw displacement of the nacelle. The cable support arrangement according to the second aspect of embodiments of the invention may be arranged to support the multiple power cable bundles in the upper region of the tower.

BRIEF DESCRIPTION

Some of the embodiments will be described in detail, with reference to the following figures, wherein like designations denote like members, wherein.

DETAILED DESCRIPTION

Figure 1:
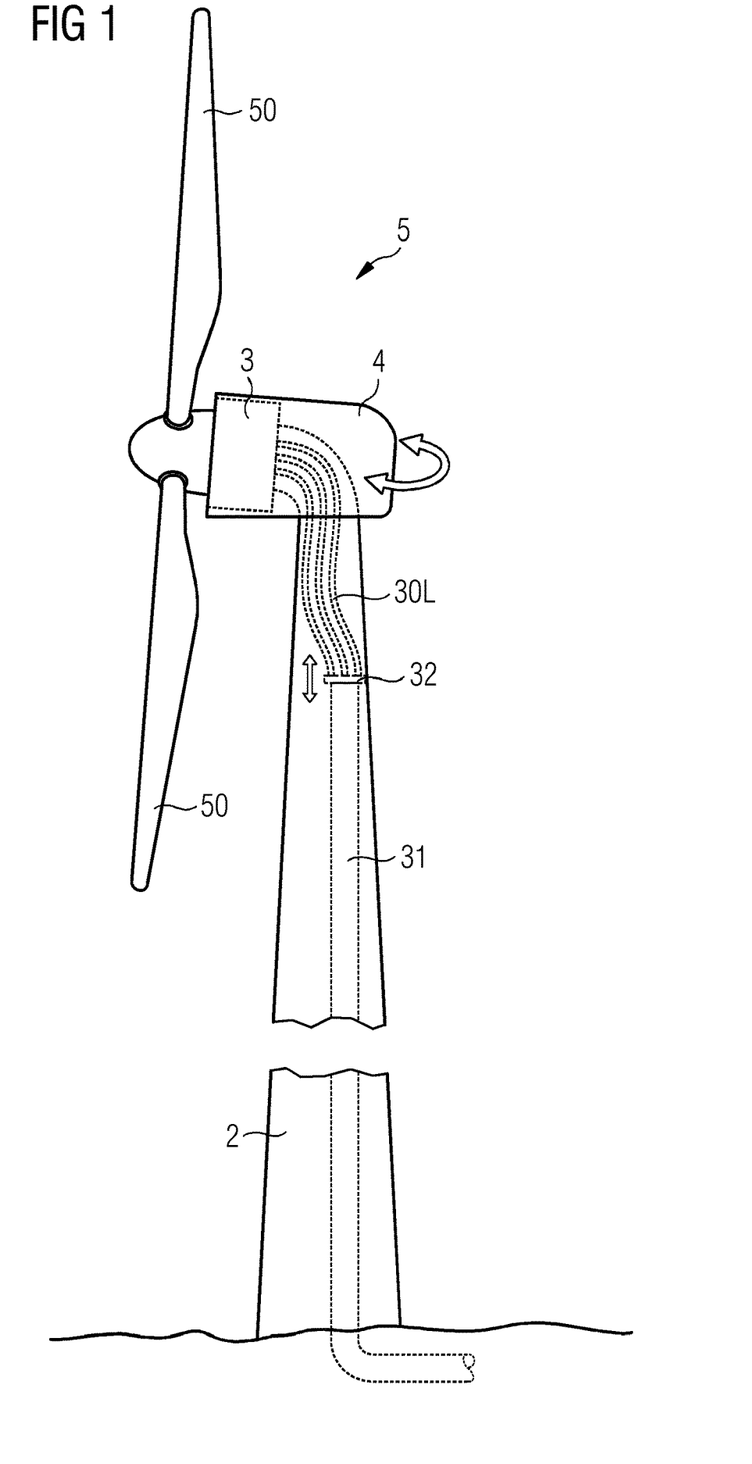
FIG. 1 an embodiment of a wind turbine according to the invention.

FIG. 1 shows an embodiment of a wind turbine 5 according to embodiments of the invention. The wind turbine 5 comprises a generator 3 housed in a nacelle 4 mounted on top of a tower 2. The generator 3 generates power as the rotor blades 50 of the wind turbine 5 rotate. The nacelle 4 can be yawed so that the rotor blades 50 are always optimally placed into the wind. The power is transported over a power cable loop 30L to a fixed transmission cable arrangement 31. The fixed transmission cable arrangement 31 may for example be secured to the wall of the tower 2. The function of the power cable loop 30L is to cope with the rotation of the nacelle 3 about a vertical axis. A nacelle may be yawed up to 720° in one direction before the direction of rotation is reversed. The power cable loop 30L generally comprises a plurality of power cables 30, depending on the number of generator poles and the number of power phases. A five-pole three-phase generator will have 15 power cables 30 in the power cable loop 30L leading from the generator 3 to the transmission cable arrangement 31. The power cable loop 30L is fixed only at the generator 3, and to a vertical displacement means 32 which can move upwards or downwards as the length of the power cable loop 30L changes in response to a yawing action. The fixation of the power cable loop 30L according to embodiments of the invention will be explained in the following.

Figure 2:
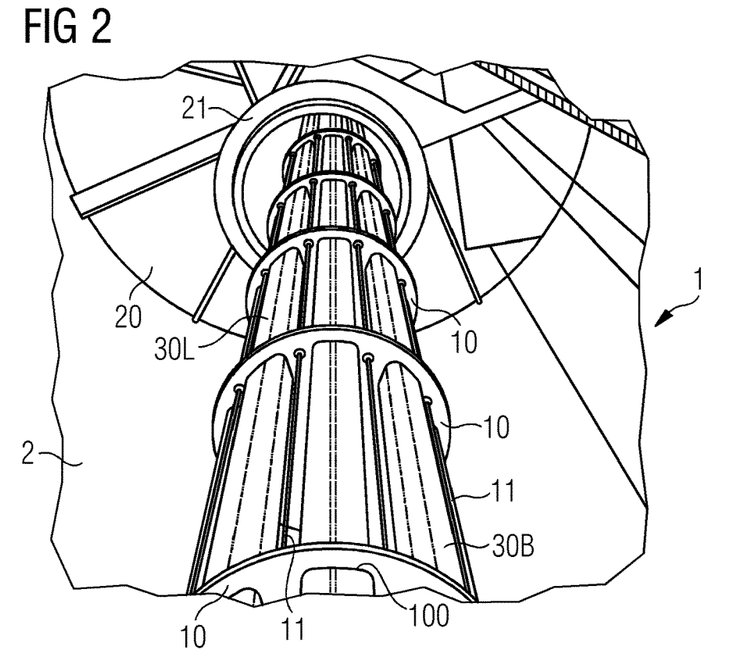
FIG. 2 a cable support arrangement according to the state of the art in a first position.

FIG. 2 shows an embodiment of a cable support arrangement 1 according to the state of the art, viewed from below inside the tower 2, looking upward towards an entry point 21 at the top level 20 of the tower 2. Here, the nacelle is in a 'null' position and the power cables 30 of the power cable loop 30L hang straight down from the top level 20 of the tower 2. The power cables are arranged in bundles 30B of three power cables 30 for a three-phase generator. Multiple cable bundle guides 10 are used to hold the power cable bundles 30B at a certain distance from each other. Adjacent pairs of cable bundle guides 10 are secured to each other by wires 11 of essentially equal length. The wires 11 ensure that the cable bundle guides 10 cannot slip down along the power cable loop 30L. As long as an uppermost cable bundle guide 10 is secured near the upper level 20, for example close to a point of entry 21, the positions of the remaining cable bundle guides 10 are fixed.

Figure 3:
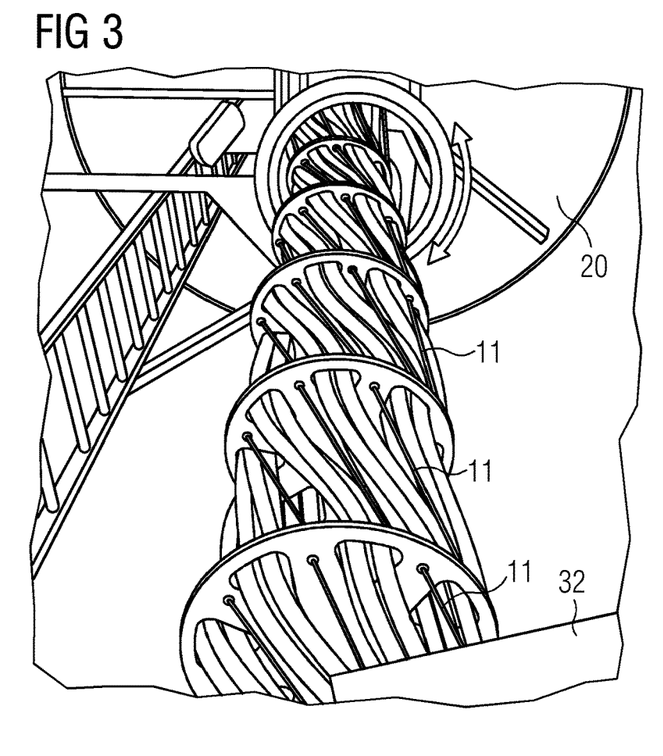
FIG. 3 the cable support arrangement of FIG. 2 in a second position.

FIG. 3 shows the cable support arrangement 1 of FIG. 2 in a second position. Here, the nacelle has been yawed by some amount, so that the power cable loop 30L has twisted, and a torque arm 32 has moved upward by a corresponding amount. The cable bundle guides 10 ensure that the power cable bundles 30B retain their relative orientations. The shape of a through-opening 100 ensures that damage to the cables 30 of a power cable bundle 30B is avoided.

Figure 4:
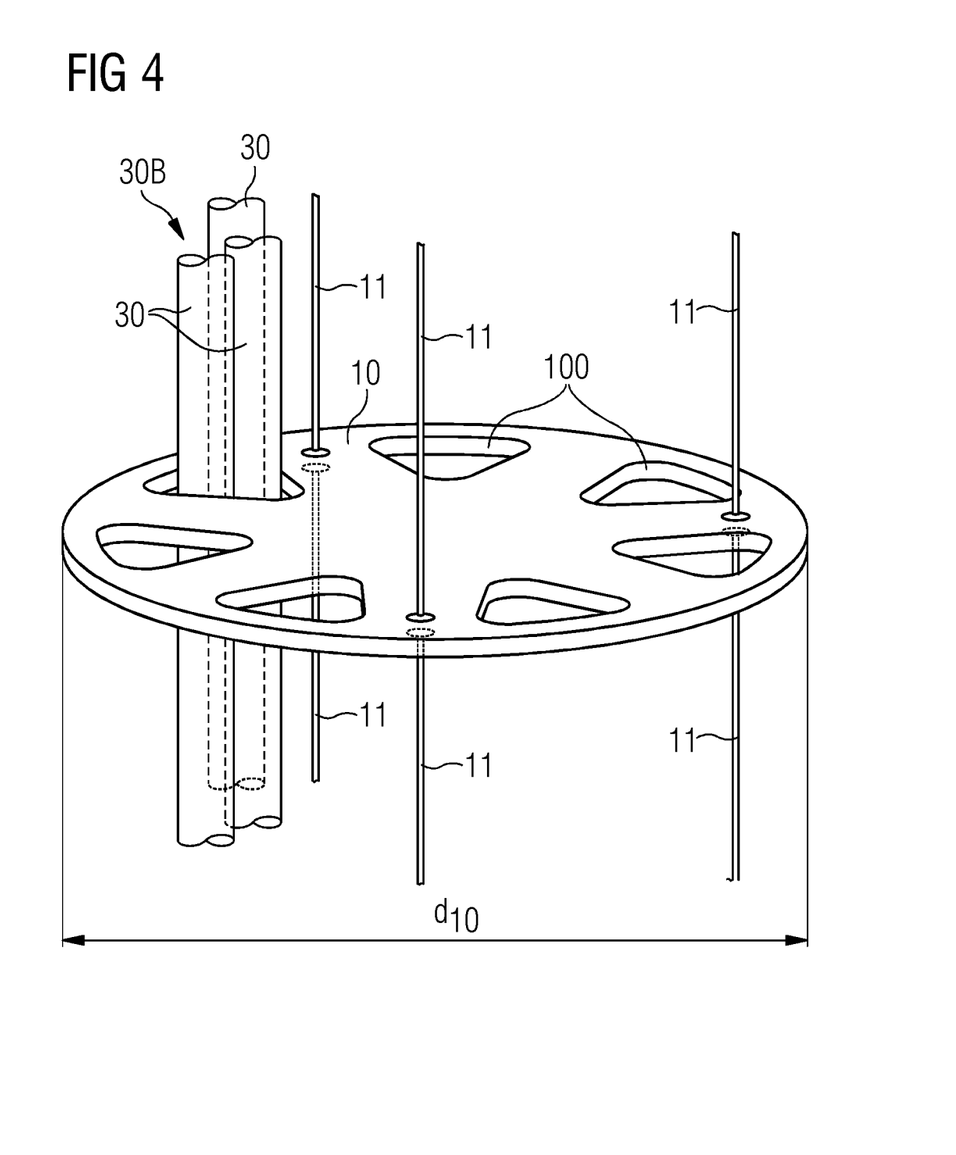
FIG. 4 a cable bundle guide according to the state of the art of the cable support arrangement of FIGS. 2 and 3.

This is shown in FIG. 4, which illustrates a form of a cable bundle guide 10 according to the state of the art with seven through-openings 100, each of which is dimensioned to accommodate a three-cable bundle 30B with some ease. The edges of the through-openings 100 are rounded to avoid pressure points acting on the power cables when the power cable loop 30L is twisted. Because the power cables are arranged in bundles 30B, the diameter $d_{10}$ of the cable bundle guide 10 is small compared to separate arrangement of power cables in through-openings of a cable bundle guide 10.

Figure 5:
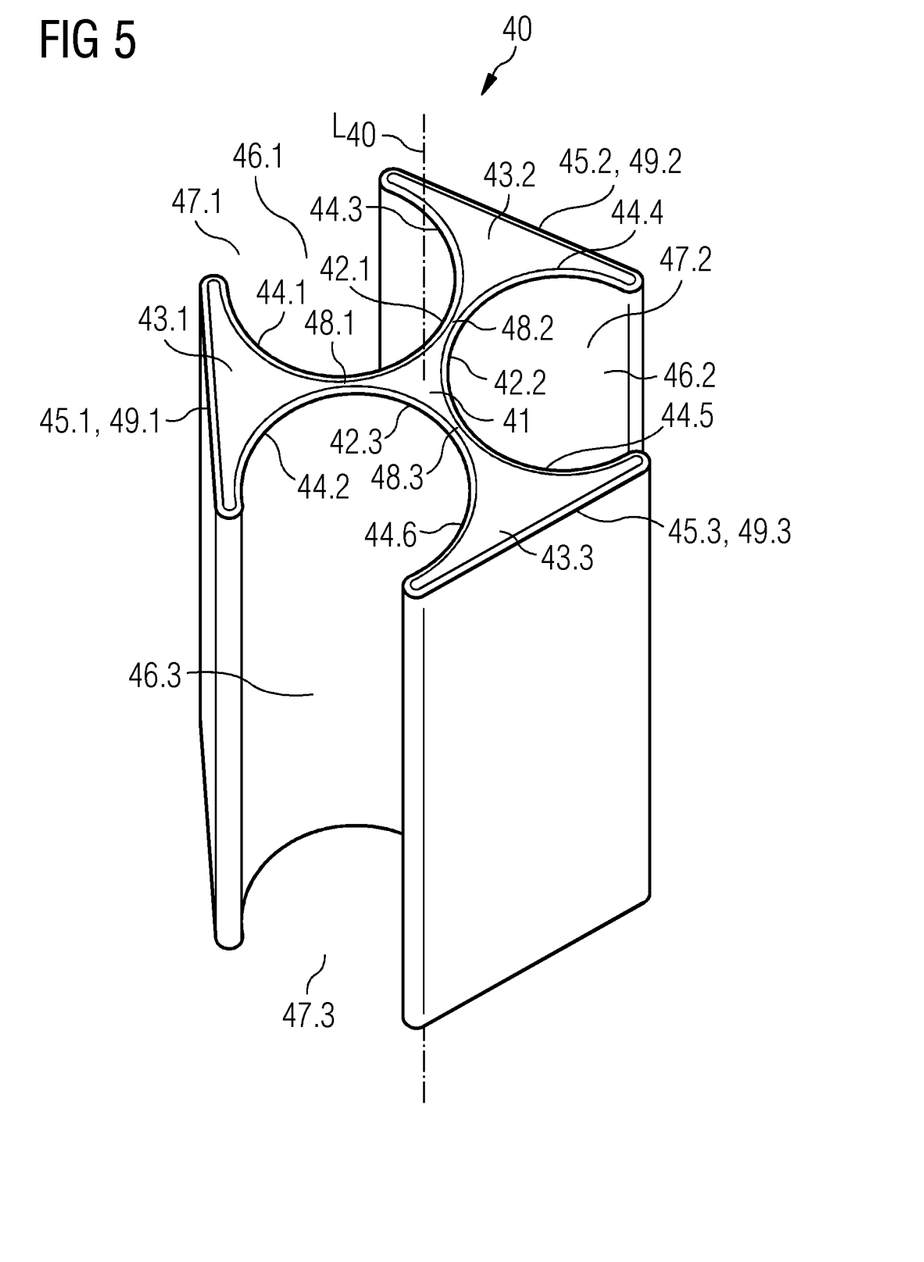
FIG. 5 an embodiment of a self-clamping cable guard according to the invention.

FIG. 5 shows an embodiment of a self-clamping cable guard 40 according to embodiments of the invention, which is used in the wind turbine 5 of FIG. 1, such that it is included in the cable support arrangement 1 of FIGS. 2 and 3 and the cable bundle guide 10 of FIG. 4. The self-clamping cable guard 40 comprises a center portion 41 and three outer portions 43.1, 43.2, 43.3. The self-clamping cable guard 40 is designed monolithically from an elastic material, such as a hardened plastic, and injection molded.

The center portion 41 has a center point congruent with the central longitudinal axis $L_{40}$ of the self-clamping cable guard 40. Further, the center portion 41 has the shape of a circular triangle with concave circular arc edges 42.1, 42.2, 42.3. The concave circular arc edges 42.1, 42.2, 42.3 run between vertex parts 48.1, 48.2, 48.3 of the circular triangle shape of the center portion 41.

Three outer portions 43.1, 43.2, 43.3 of the self-clamping cable guard 40 are arranged at the vertex parts 48.1, 48.2, 48.3. Each of the three outer portions 43.1, 43.2, 43.3 has the shape of a circular triangle with two concave circular arc edges 44.1, 44.2, 44.3, 44.4, 44.5, 44.6 and one straight edge 49.1, 49.2, 49.3. The straight edges 49.1, 49.2, 49.3 of the outer portions 43.1, 43.2, 43.3 are wear protection surfaces 49.1, 49.2, 49.3 of wear protection plates 45.1, 45.2, 45.3 formed by the outer portions 43.1, 43.2, 43.3.

The respective concave circular arc edges 42.1, 42.2, 42.3 of the center portion 41 and the respective concave circular arc edges 44.1, 44.2, 44.3, 44.4, 44.5, 44.6 of the outer portions 43.1, 43.2, 43.3 form circular recesses 46.1, 46.2, 46.3 for insertion of the power cables 30 therein. For this purpose, the recesses 46.1, 46.2, 46.3 are elastically widened and the power cables 30 are inserted therein through open sides 47.1, 47.2, 47.3 of the recesses 46.1, 46.2, 46.3. The open sides 47.1, 47.2, 47.3 are respectively limited by two of the three wear protection plates 45.1, 45.2, 45.3 to protect the power cables 30 clamped inside the recesses 46.1, 46.2, 46.3 from wear.

Figure 6:
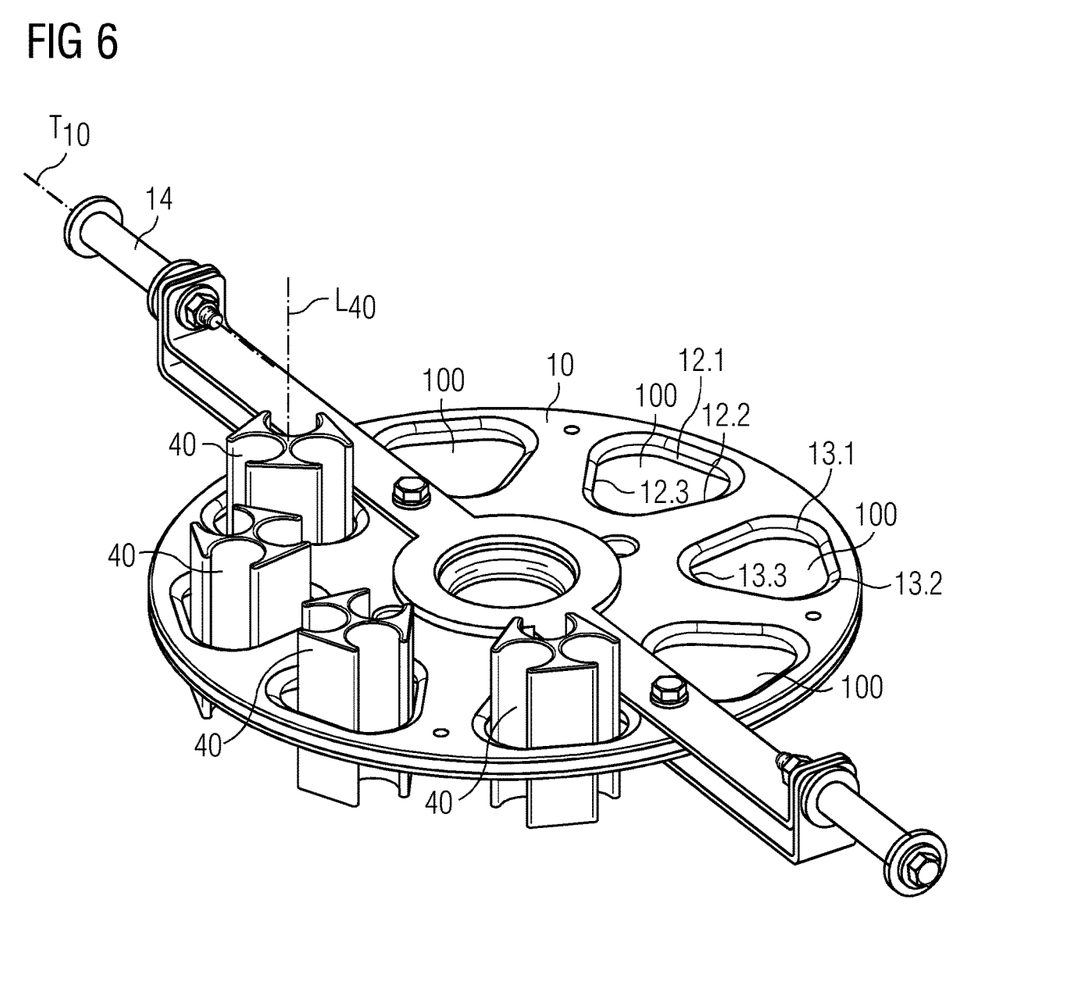
FIG. 6 an embodiment of a cable support arrangement according to the invention comprising the self-clamping cable guard of FIG. 5.

FIG. 6 shows an embodiment of a cable support arrangement 1 according to embodiments of the invention comprising multiple self-clamping cable guards 40 according to FIG. 5.

The cable support arrangement 1 is shown with one cable bundle guide 10 having multiple, in this case eight, through-openings 100. The cable bundle guide 10 is provided as a circular plate having the through-openings 100 arranged around its center point. The through-openings 100 have a triangular shape corresponding to the triangular shape of the power cable bundles 30B. The cable support arrangement 1 may comprise multiple cable bundle guides 10 arranged at a distance from one another although only one is shown.

The cable bundle guide 10 is tiltable with respect to a tilting axis $T_{10}$ perpendicular to the central longitudinal axis $L_{40}$ of the multiple self-clamping cable guards 40 by means of a tilting mechanism 14.

Each one of the multiple self-clamping cable guards 40 is shown to be inserted into each one of the multiple through-openings 100. For clarity purposes, the power cables 30 are omitted in this illustration.

The wear protection surfaces 49.1, 49.2, 49.3 are arranged parallel to straight edges 12.1, 12.2, 12.3 of the through-openings 100. The corners 13.1, 13.2, 13.3 of the triangular shape of the through-openings 100 are provided with clearance with respect to the power cables 30 such that they are not subjected to wear.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A cable support arrangement for a wind turbine comprising:
   a plurality of self-clamping cable guards for clamping power cables of a power cable bundle of the cable support arrangement in the wind turbine, each self clamping guard comprising:
      three recesses arranged about a central longitudinal axis of the self-clamping cable guard for positively clamping a power cable of the power cable bundle inside of each of the three recesses, and
      three wear protection plates arranged about the central longitudinal axis, whereby each of the three recesses comprises an open side for insertion of a respective power cable of the power cable bundle therein, each of the open sides of one of the three recesses being respectively limited by two of the three wear protection plates to protect the power cables clamped inside the recesses from wear; and
   at least one cable bundle guide and multiple power cable bundles, each power cable bundle consisting of three power cables, and whereby each of the multiple self-clamping cable guards clamps in every one of the three recesses one of the three power cables of each of the multiple power cable bundles, and whereby each one of the multiple plurality of self-clamping cable guards with the power cables clamped inside thereof is arranged in one of multiple through-openings inside of the at least one cable bundle guide;
   wherein the at least one cable bundle guide comprises a tilting mechanism for tilting the cable bundle guide around a tilting axis perpendicular to the central longitudinal axis of the plurality of self-clamping cable guards.

2. The cable support arrangement according to claim 1, wherein the multiple through-openings inside of the at least one cable bundle guide have a triangular shape with straight edges and the wear protection plates of the self-clamping cable guards are arranged parallel to the straight edges of the triangular shape of the through-openings.

3. The cable support arrangement according to claim 1, wherein the at least one cable bundle guide is a circular plate and the multiple through-openings are arranged about a center point of the circular flat plate.

4. A wind turbine comprising a nacelle mounted on top of a tower of the wind turbine, a generator arranged inside the nacelle for generating electricity, and a cable support arrangement according to claim 1.

5. The cable support arrangement according to claim 1, wherein the self-clamping cable guard is made from an elastic and/or flexible material such that the three recesses can be elastically widened for receiving the power cables and elastically reset to clamp the power cables.

6. The cable support arrangement according to claim 1, wherein the self-clamping guard further comprises a center portion, whereby the center portion has a center point congruent with the central longitudinal axis and the center portion has a shape of a circular triangle with concave circular arc edges.

7. The cable support arrangement according to claim 6, further comprising three outer portions extending outwards from the center portion, whereby each of the three outer portions is attached to a vertex part of the circular triangle shape of the center portion.

8. The cable support arrangement according to claim 7, wherein each of the outer portions has a shape of a circular triangle with two concave circular arc edges and one straight edge, wherein the straight edge is a wear protection surface of one of the three wear protection plates.

9. The cable support arrangement according to claim 1, wherein the wear protection plates are congruent with an imaginary triangle, the imaginary triangle having a center point congruent with the central longitudinal axis and circumscribing the self-clamping cable guard.

10. The cable support arrangement according to claim 1, wherein the self-clamping cable guard is monolithically designed.

11. The cable support arrangement according to claim 1, wherein the self-clamping cable guard is injection molded.

* * * * *